(12) United States Patent
Labas (10) Patent No.: US 12,304,655 B2
(45) Date of Patent: May 20, 2025

(54) PROTECTIVE COVER FOR AIRCRAFT ENGINES

(71) Applicant: Protech Engine Solutions, Calgary (CA)

(72) Inventor: Robert George Labas, Calgary (CA)

(73) Assignee: Protech Engine Solutions, Calgary (CA)

( * ) Notice: Subject to any disclaimer, the term of this patent is extended or adjusted under 35 U.S.C. 154(b) by 235 days.

(21) Appl. No.: 18/064,727

(22) Filed: Dec. 12, 2022

(65) Prior Publication Data

US 2024/0190583 A1    Jun. 13, 2024

(51) Int. Cl.
B64F 1/00    (2024.01)

(52) U.S. Cl.
CPC .................................. B64F 1/005 (2013.01)

(58) Field of Classification Search
CPC ..................................................... B64F 1/005
See application file for complete search history.

(56) References Cited

U.S. PATENT DOCUMENTS

| | | | | |
|---|---|---|---|---|
| 2,417,636 A * | 3/1947 | Ditzler | ..................... | F02N 19/10 219/202 |
| 3,623,565 A * | 11/1971 | Ward | ..................... | B62D 61/10 180/68.1 |
| 3,646,980 A | 3/1972 | Peterson | | |
| 5,143,321 A | 9/1992 | Jackson | | |
| 5,255,875 A * | 10/1993 | Maglieri | ................. | B64F 1/005 114/361 |
| 5,409,286 A * | 4/1995 | Huang | ..................... | B60J 11/00 160/370.21 |
| 5,924,386 A * | 7/1999 | Lewis | ..................... | A63K 3/046 119/705 |
| 5,927,793 A * | 7/1999 | McGrath, Jr. | ............ | B60J 11/00 160/370.21 |
| 8,516,785 B2 | 8/2013 | Brown | | |

(Continued)

FOREIGN PATENT DOCUMENTS

| | | |
|---|---|---|
| CA | 2458434 C | 8/2004 |
| DE | 202012100112 U1 | 2/2012 |

(Continued)

OTHER PUBLICATIONS

WeatherMAX SG © [https://web.archive.org/web/20211025063954/ https://weathermax.com/wp-content/uploads/2020/09/WMAX-SG-Sample-Card-2019.pdf archived on Oct. 25, 2021] (Year: 2021).*

Primary Examiner — Lorne E Meade
(74) Attorney, Agent, or Firm — Argus Intellectual Enterprise, LLC; Daniel Enea; Jordan Sworen (57) ABSTRACT

A protective cover for protecting aircraft engines is disclosed, the protective cover comprising a generally circular cross-section, a circumference, an outer side, and an inner side; said circumference being defined by a frame element having generally circular ring shape formed by a rod unit; said frame element comprising a plurality of attaching mechanisms being dispersed around said ring shaped frame, and being sized and configured to releasably attach said protective cover to an engine; said generally circular cross-section comprising one or more fabric layers contained in said ring shaped frame element. The protective cover is easily installed due to its attaching mechanisms and its breathable and durability protects the engine from damage.

16 Claims, 9 Drawing Sheets

(56) References Cited

U.S. PATENT DOCUMENTS

| | | |
|---|---|---|
| 9,446,857 B2 | 9/2016 | Sparks et al. |
| 2009/0101760 A1 | 4/2009 | Ghogomu |
| 2011/0011055 A1 | 1/2011 | Troy |
| 2013/0000271 A1 | 1/2013 | Sonei |
| 2014/0259947 A1 | 9/2014 | Sparks |
| 2019/0059565 A1* | 2/2019 | Thompson .............. B63B 32/87 |

FOREIGN PATENT DOCUMENTS

| | | |
|---|---|---|
| DE | 102018206650 A1 | 10/2019 |
| DE | 102019200939 A1 | 7/2020 |

* cited by examiner

PROTECTIVE COVER FOR AIRCRAFT ENGINES

FIELD OF THE INVENTION

The present invention relates generally to the field of protective covers, and more specifically to protective covers for aircraft engine inlets and exhausts.

BACKGROUND

Any discussion of the related art throughout the specification should in no way be considered as an admission that such related art is widely known or forms part of common general knowledge in the field.

There is a need for a more maintenance user friendly aircraft engine cover that covers an aircraft engine and allows work to be carried out on the engine without the need for removing the cover.

Damage can be done to engines and engine cowling if or when covers are not used.

Generally, the covers currently available have long entangling straps, and require a ladder or stand to install and to reach an engine's anchor points. This is considered a safety concern, especially in windy or icy conditions.

Furthermore, some existing covers have very long straps which never get removed and stored properly, making the next user waste valuable time opening the previously stored cover and needing to untangle 10-15-foot-long straps, then needing to align the cover top to the engine top, and then needing to carry the cover up a ladder to be installed, which can be unsafe in cold and windy conditions.

In addition, existing covers with long straps hold the cover on at a far back end of an engine, meaning that the entire cover needs to be removed for maintenance.

U.S. Pat. No. 3,646,980A discloses a jet engine cowl cover for placement over the intake opening of jet engine nacelles and the like which has a substantially rigid, lightweight outer ring constructed to fit into the opening and which includes stop means limiting the inward movement of the ring into the nacelle. The periphery of a translucent plastic sheet is tautly secured to the ring to close the nacelle opening when the ring is in place. The exterior surface of the ring includes a gasket that seals the ring to the nacelle and which applies a releasable force biasing the cowl cover against the nacelle. The plastic sheet includes a V-shaped slit so that a center portion of the sheet can be opened to provide access into the nacelle interior through the sheet and which can, thereafter, be closed to protect the nacelle interior from the atmosphere and atmospheric contaminants.

CA2458434C discloses a protection device for a jet engine air intake structure of a jet engine, said structure comprising an air intake cowl and an air intake lip that jointly delimit a fan case ducting, the cowl having a top portion provided with at least one ventilation scoop and the lip defining a fan case ducting intake, the device comprising a protective tarpaulin with a main portion designed to close off the intake when the device is assembled on the structure. According to the invention, the protective tarpaulin also comprises a secondary portion fixed to the main portion, said secondary portion being provided with stiffening means and designed to partially cover the cowl, to close off each ventilation scoop.

DE202012100112U1 discloses a cover for aircraft engines comprising a cover tarpaulin for an air inlet of an aircraft jet engine with an essentially circular cross-section, which covers the air inlet and is attached to bores provided in a casing of the jet engine by means of ball locking pins is releasably attached, characterized in that a cap-shaped cut that fits for the air inlet and has a circumferential edge which rests on the fairing of the jet engine is provided, the edge extends beyond the bores in the casing and through openings assigned to the bores are provided in the edge.

DE102018206650A1 discloses a cover for an engine nacelle for releasable attachment to an engine intake and/or to an engine outlet of an engine nacelle. The cover has at least one heating device. The cover preferably forms a closed surface with which the engine intake or outlet (at least substantially) can be completed. In this way, a rapid escape of the heat provided by the heater in use can be prevented, which means a saving of energy and time. In particular, the cover preferably comprises a tarpaulin cover for protecting the engine inlet or outlet, for example against the ingress of animals or foreign bodies. Such a (preferably flexible and thus easy to store) tarpaulin, which is preferably adapted to wind-tight cover the engine inlet and outlet, may for example comprise a coated fabric and/or polyvinyl chloride (PVC).

U.S. Pat. No. 5,143,321A discloses a folding protective cover for turbo-engines, primarily for openings which are generally circular in shape, particularly the air inlet and exhaust ducts of a stopped turbo-engine as used by aircraft. The invention is comprised of a generally circular ring shaped frame which is made up of four arc shaped sections of approximately 90 degrees each. Three hinges are mounted between the sections in such a manner that the frame may be folded into an arc of approximately 90 degrees. Affixed to the outer edge of the frame is a resilient gasket and affixed across the center of the frame is a waterproof fabric panel.

DE102019200939A1 discloses an aircraft engine cover, which is attached to a wing of an aircraft by means of a mounting pylon, which is made in one piece and has a front, two flank sides and a locking mechanism along the edges of the flank sides. The cover is adapted to the outer shape of an aircraft engine in such a way that the cover lies in an assembled state on the outer surface of the aircraft engine and completely surrounds and covers the aircraft engine. The closed locking mechanism connects the flank sides to each other and runs from the front along the lower keel line of the aircraft engine to the rear end of a recess for the fastening pylon.

U.S. Pat. No. 9,446,857B2 discloses an engine cowl and inlet cover and a method for covering an end of a housing for an engine. A cover is positioned relative to the end of the housing for the engine. The cover comprises a structure, a flange comprised of a deformable material extending from the structure around a circumference of the structure, and a retaining feature configured to extend from a middle portion of the structure such that the retaining feature and the flange form a channel configured to receive the end of the housing. The cover is moved in a direction towards the end of the housing for the engine such that the retaining feature extends into an inlet of the engine through an opening of the housing to form an interference fit between the retaining feature and a portion of an interior surface of the housing.

US20090101760A1 discloses an aircraft engine protection unit (A.E.P.U). A Protective Screen specifically designed to be mounted, anchored or fitted at the front intake of a jet engine nacelle aircraft to prevent the ingestion of birds and other foreign airborne objects of substantial amount(s), size(s), and quantities from entering the engine. The external front view of the Aircraft Engine Protection Unit (AEPU) screen is a Radial Dome-Shaped Screen with interlocking mesh wires, rods and bars braced or welded together. This screen is anchored to the front external nacelle of the aircraft engine, attached with the aid of I-Bar (Arm) structures fastened on the outside panels securing the AEPU Screen in the front position. A De-icing mechanism is installed to enable defrosting by means of electrical and/or avionics systems incorporated in the AEPU system.

U.S. Pat. No. 8,516,785B2 discloses a jet engine intake guard system, wherein direct axial air flow into an engine during takeoff and landing may be temporarily closed off while air intake is provided laterally through screened air intake ports located on a cylindrical housing that extends forward of the conventional air intake cowling openings.

US20110011055A1 discloses a jet engine air intake guard comprising a deflector, a steep dome-shaped device with sharply pointed forepart, a secondary device which is carefully designed to insert into the base component, in order to deflect birds or any foreign objects out of the air stream and to provide an adequate air intake to the jet-engine during use. According to the invention, the protective device also comprises a base component put over the air intake cowl being provided with stiffening means completely cover the air intake cowl to hold the protective device firmly while operating is being disclosed in the present application.

US20130000271A1 discloses an engine shield including an engine shield for protecting a jet engine intake. The engine shield includes a base, a first support and a second support. The first and second supports include a first end and a second end opposite the first end and are attached to the base at a first end. The engine shield also includes an apex attached the second end of the first support and the second end of the second support. The base, first support, second support and apex define an inner volume with an inner surface and an outer volume with an outer surface. The engine shield further includes a ring. The ring is attached to the first support between the base and the apex and the second support between the base and the apex. The engine shield additionally includes a mesh, where the mesh covers the outer surface.

All documents cited herein are incorporated by reference.

None of the above cited documents, alone or in combination satisfy the need for an engine cover that: 1) has structure built into an inlet cover so that the cover maintains form upon installation, 2) allows a cover to be installed and removed without the need for stands or ladders, and/or 3) has material is water resistant yet breathable, allowing moisture to be released from inside the engine and area while keeping moisture out.

BRIEF SUMMARY

It is an object of the invention to provide a protective cover for covering aircraft engines that: 1) has structure built into an inlet cover so that the cover maintains form upon installation, 2) allows a cover to be installed and removed without the need for stands or ladders, and/or 3) has material is water resistant yet breathable, allowing moisture to be released from inside the engine and area while keeping moisture out.

In accordance with an aspect of the invention, there is disclosed a protective cover for engines, comprising: a generally circular cross-section, a circumference, an outer side, and an inner side, said circumference being defined by a frame element having generally circular ring shape formed by a rod unit; said frame element comprising a plurality of attaching mechanisms being dispersed around said ring shaped frame, and being sized and configured to releasably attach said protective cover to an engine; said generally circular cross-section comprising one or more fabric layers contained in said ring shaped frame element.

The advantages and features of the present invention will become better understood with reference to the following more detailed description and claims taken in conjunction with the accompanying drawings in which like elements are identified with like symbols.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In the figures, embodiments are illustrated by way of example. It is to be expressly understood that the description and figures are only for the purpose of illustration and as an aid to understanding.

Embodiments will now be described, by way of example only, with reference to the attached figures, wherein the figures.

DETAILED DESCRIPTION

The term "connected", "attached", "affixed" or "coupled to" may include both direct coupling (in which two elements that are coupled to each other contact each other) and indirect coupling (in which at least one additional element is located between the two elements).

Devices and methods for carrying out the invention are presented in terms of embodiments depicted within the FIGS. However, the invention is not limited to the described embodiments, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and the configurations shall be shown and described for purposes of clarity and disclosure and not by way of limitation of scope.

The features of the invention which are believed to be novel are particularly pointed out in the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

Figure 1:
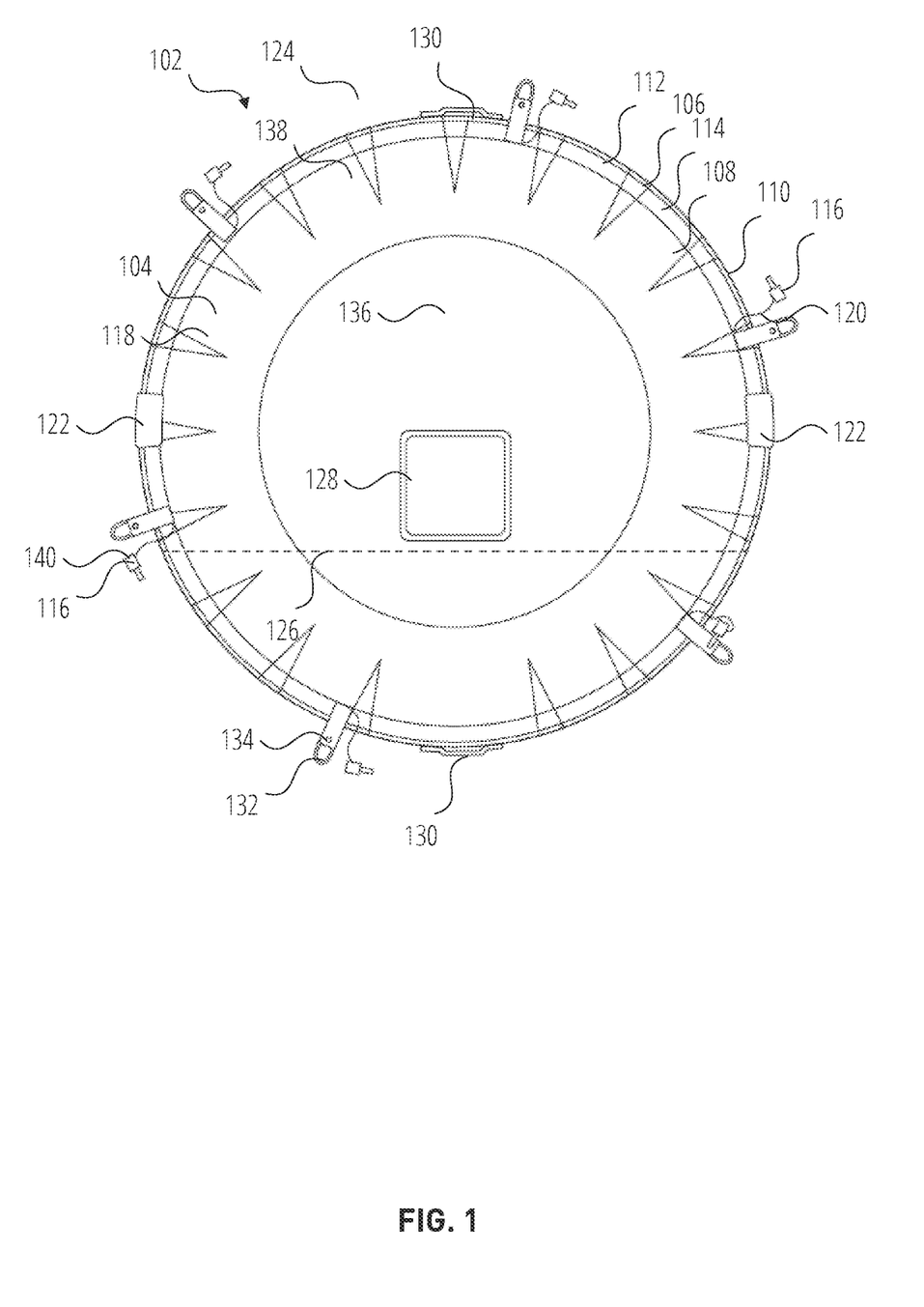
FIG. 1 illustrates a top-down view of an aspect of the subject matter in accordance with one embodiment.

FIG. 1 illustrates a protective cover 102 for protecting aircraft engines comprising: a generally circular cross-section 104, a circumference 106, an outer side 110, and an inner side 108 (unable to be seen from this perspective) opposite to said outer side.

The circumference 106 is preferably defined by a generally circular ring-shaped frame element 112, the shape formed by a rod unit 114. The rod unit 114 preferably comprises spring steel or fiberglass, and in some embodiments, may be encased in a hollow tube unit, such as cross-linked polyethylene tube, to protect an aircraft's skin from being in contact with the rod unit 114.

Preferably, the rod unit 114 is attached to a hinge element 122, enabling a user to fold the protective cover 102 into a folded configuration for storing the protective cover 102. The hinge element 122 may be covered by leather or some other means of protecting the hinge element 122.

The frame element 112 preferably comprises a plurality of attaching mechanisms 116 being dispersed around said generally circular ring-shaped frame element 112, and being sized and configured to releasably attach said protective cover to an engine. The plurality of attaching mechanisms 116 may comprise thumb bolts 140. Said attaching mechanisms 116 can be seen in greater detail in FIGS. 6A-6C.

The generally circular cross-section 104 typically comprises one or more fabric layers 118 contained in said ring shaped frame element 112.

The one or more fabric layers 118 comprising an outer layer on said outer side 110, and an inner layer on said inner side 108. The outer side is in contact with the elements, while the inner side contacts the aircraft. The outer layer comprises a durable, waterproof, and breathable fabric and said inner layer comprises a soft, scratch resistant, flannel-like fabric. The outer layer may preferably, but need not necessarily, also comprise an additional waterproof and oil shedding finish layer.

For example, the one or more fabric layers 118 may comprise commercially available materials such as WeatherMax SG (Safe Guard) material which has a durable, waterproof outer layer and an inner layer comprised of a soft, flannel-like backing to provide an extra level of scratch and scuff resistance for high end surfaces, or WeatherMax 80, a waterproof material without an inner layer. The outer layer preferably provides a highwater resistance combined with breathability. A flannel-like backing is generally less likely to entangle contaminants compared to most commercially available plastic materials, such as needle punch polyesters.

Optionally, the outer layer may also comprise an extra waterproof finish, for example a Hydromax finish, which is added over the outer layer, to enhance its water and oil shedding capabilities.

Preferably, the protective cover 102 can be washed with a warm mild soapy water and detergent solution. The WeatherMax SG is used on areas that are in contact with an aircraft's lipskin, while areas that are not in contact with the aircraft lipskin are made from WeatherMax 80, which has the same properties but without the soft backing.

For example, in the embodiment shown herein, the center section 136 is preferably made from a durable, water repellent, yet breathable material, for example, the WeatherMax 80. This section preferably does not contact the aircraft. The outer section 138 is in contact with the aircraft and is preferably made from a durable, water repellent, breathable material with a soft, flannel-like backing, for example, the WeatherMax SG.

Typically, the protective cover 102 comprises an inspection door 128, which is an opening housed in the one or more fabric layers 118, which enables a user, such as an aircraft engine maintenance person, to inspect the engine without needing to remove the protective cover 102. The inspection door 128 may be covered with a removable section of fabric, for example a durable, water repellent material.

The protective cover 102 may also, but need not necessarily, comprise a plurality of handles 130 affixed to said protective cover 102, providing a means of grasping said protective cover 102.

The protective cover 102 further comprises one or more hinge elements 122 attached to the frame element 112, said hinge elements 122 enabling said protective cover 102 to unfold to an unfolded, large, engine covering configuration 124 or fold to a small, storage configuration.

Typically, the generally circular ring-shaped frame elements 112 are comprised of one or two rod units 114 which form the ring-shape.

The rod units 114 are preferably composed of spring steel or fiberglass.

The embodiment shown herein also comprises pull tabs 132, for providing a means of pulling the protective cover 102 over the engine. They are generally reinforced by threaded grommet elements 134. Typically, the pull tabs 132 are made from the same material as the protective cover 102.

There may be one or more stitch lines 126, as the one or more fabric layers 118 are reinforced by double stitching.

The protective cover 102 may be hung during storage from any of the plurality of handles 130, which are typically made from a durable fabric, such as 2-inch wide webbing, folded in half.

Figure 2:
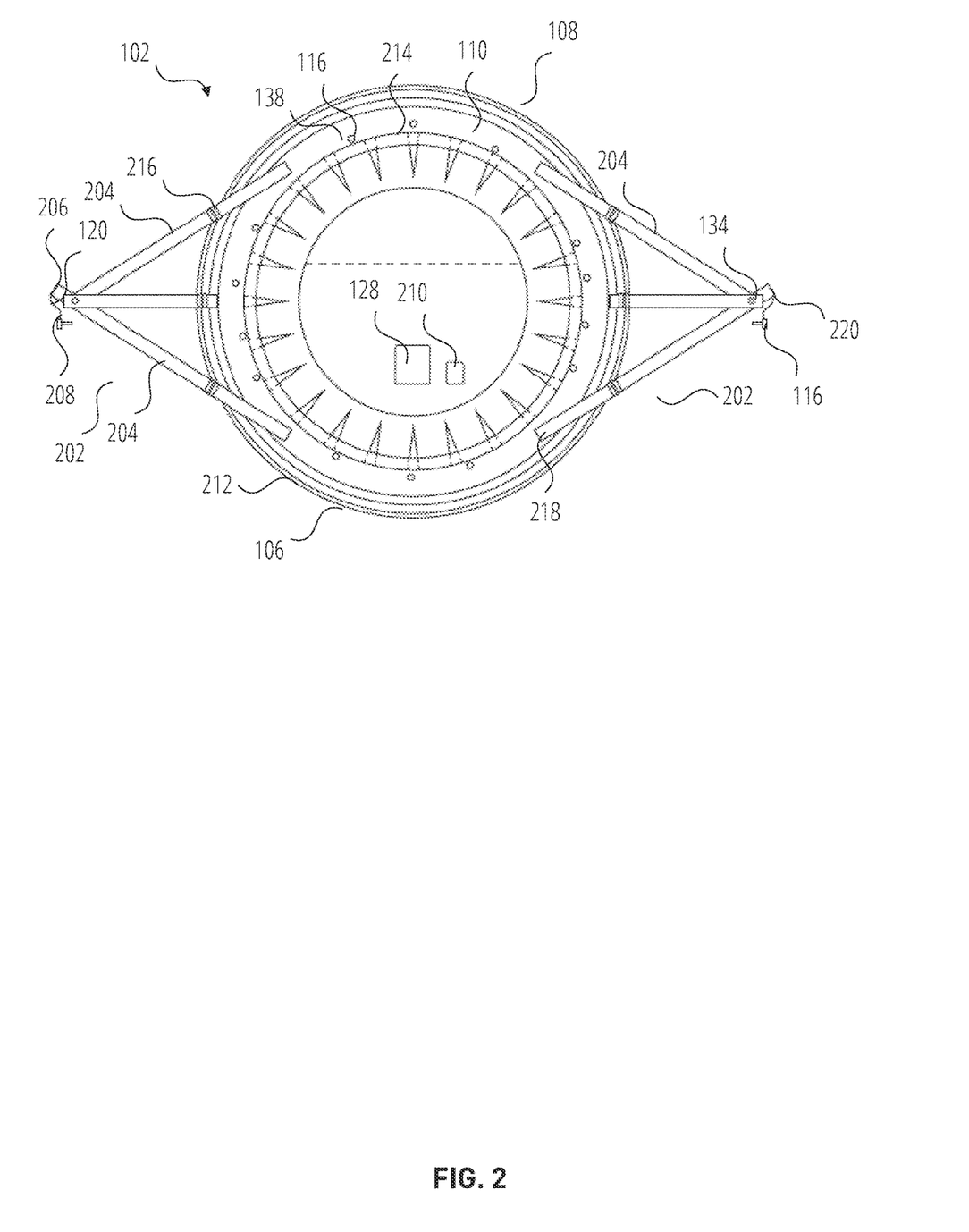
FIG. 2 illustrates a top-down view of an aspect of the subject matter in accordance with one embodiment.

FIG. 2 illustrates an alternate embodiment of a protective cover 102, comprising flexible strap elements 202.

Preferably, the flexible strap elements comprise webbing strap 204, attached at one webbing strap end 218 to the protective cover 102, for providing a means of securing the protective cover 102 to an aircraft engine. The webbing strap 204 can be adjusted in length by a ladder lock 216 and attached to one another by the threaded grommet elements 134. The webbing strap 204 preferably, but need not necessarily, comprises 2 inch wide webbing. The ladder lock 216 is preferably also two inches wide.

The protective cover 102 is attached to an aircraft engine by a plurality of attaching mechanisms 116, some of which are attached to a second webbing strap end 220 at a first end 206 by a cable element 120, so they cannot be detached from the cover protective cover 102 and accidentally be left on an engine when the protective cover is removed from the engine. The second end 208 of the plurality of attaching mechanisms 116 attaches the protective cover 102 to an aircraft engine.

Preferably, the cable element 120 is manufactured from a 1/16th inch vinyl coated stainless steel aircraft cable.

Additional attaching mechanisms 116 may be seen around the outer section 138. These are held in place by a bungee cord 214, which circles the outer section 138. The plurality of attaching mechanisms 116 around the outer section 138 may comprise two or more different kinds of attaching mechanisms 116, and are configured to further attach the protective cover 102 to an aircraft engine. The bungee cord is preferably housed between said outer side 110 and said inner side 108.

In this embodiment, in addition to an inspection door 128, the protective cover 102 also comprises a humidity indicator window 210, for indicating humidity conditions.

This embodiment further comprises an elastic 212, which circles the protective cover 102, and provides a means to seal the protective cover 102 around the aircraft engine. The elastic 212 may be unhoused and located on the outer side 110 of the protective cover and extends around the circumference 106.

Figure 3:
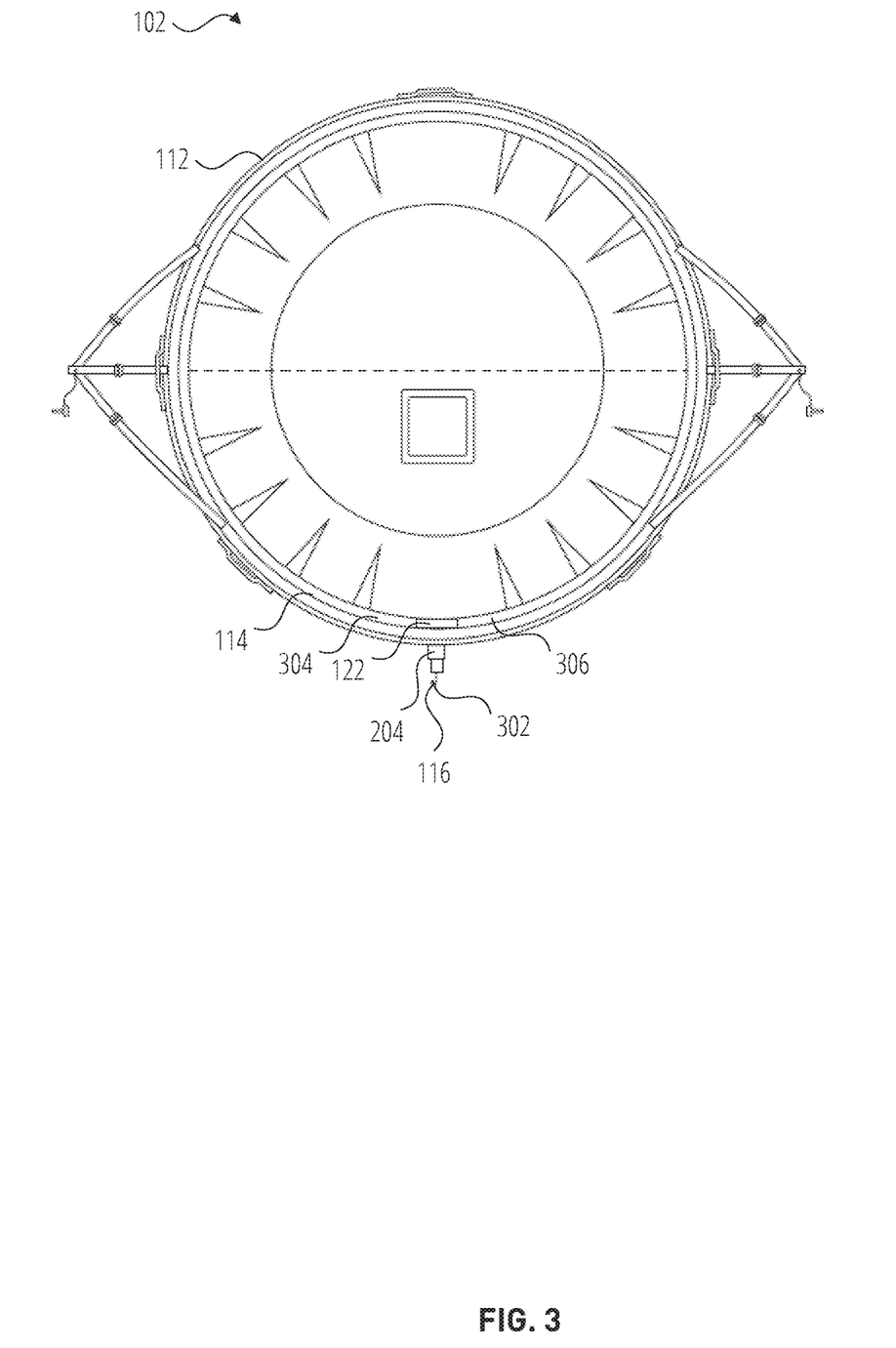
FIG. 3 illustrates a top-down view of an aspect of the subject matter in accordance with one embodiment.

FIG. 3 illustrates an alternate embodiment of the protective cover 102 with a hinge element 122 configured to swivel, twist, and/or rotate. The hinge element 122 is shown in greater detail in FIGS. 7A, 7B, and 7C.

A first rod unit end 304 and a second rod unit end 306 each attach to a hinge element 122. Preferably, they are attached with epoxy.

Twisting said first and second rod unit ends 304, 306 can fold or unfold the generally circular ring-shaped frame element 112 for a storage configuration or for an engine covering configuration.

In this embodiment, the rod unit 114 is a spring steel rod, encased in a hollow tube unit made from cross-linked polyethylene tubing, for example cross-linked high density polyethylene. This maintains structure in the generally circular ring-shaped frame element 112.

Another embodiment of the plurality of attaching mechanisms 116 is shown herein, in the form of a hook unit 302, attached to the protective cover 102 by a webbing strap 204. The hook unit 302 may be hooked to an aircraft engine. It is preferably made from a hard plastic.

Figure 4:
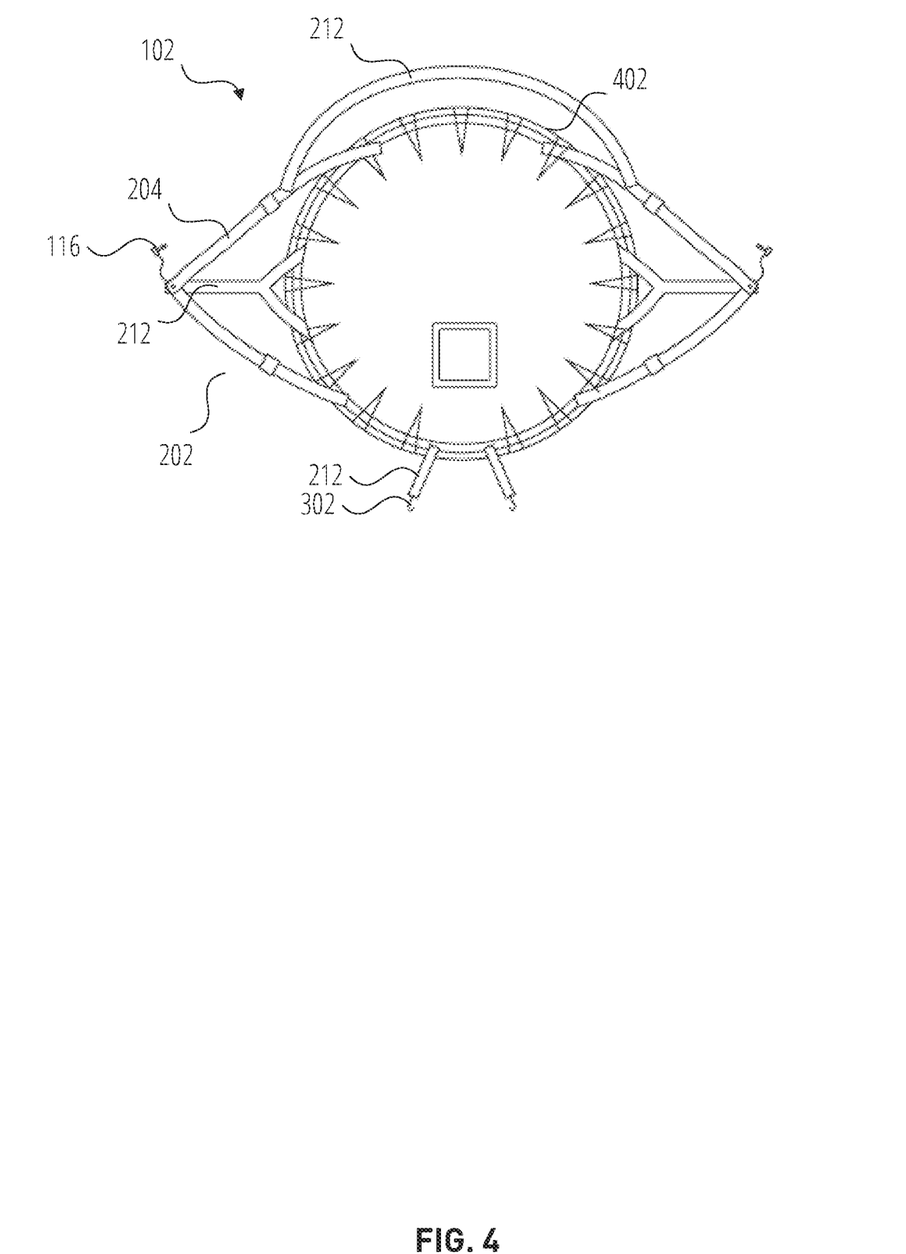
FIG. 4 illustrates a top-down view of an aspect of the subject matter in accordance with one embodiment.

FIG. 4 illustrates an alternate embodiment of the protective cover 102, where the protective cover 102 attaches and secures to the engine aircraft with a variety of the plurality of attaching mechanisms 116, including thumb bolts 140 and hook units 302. The flexible strap element 202 comprises several elastics 212 and webbing straps 204 for further securing the protective cover 102 to the aircraft engine.

The embodiment shown has no hinge element 122, and the rod unit 114 is alternatively a flexible or stretchy material such as an elastic band 402, for securing the protective cover 102 to an engine cowl, and enabling the protective cover 102 to be simply folded or crumpled for storage.

Figure 5:
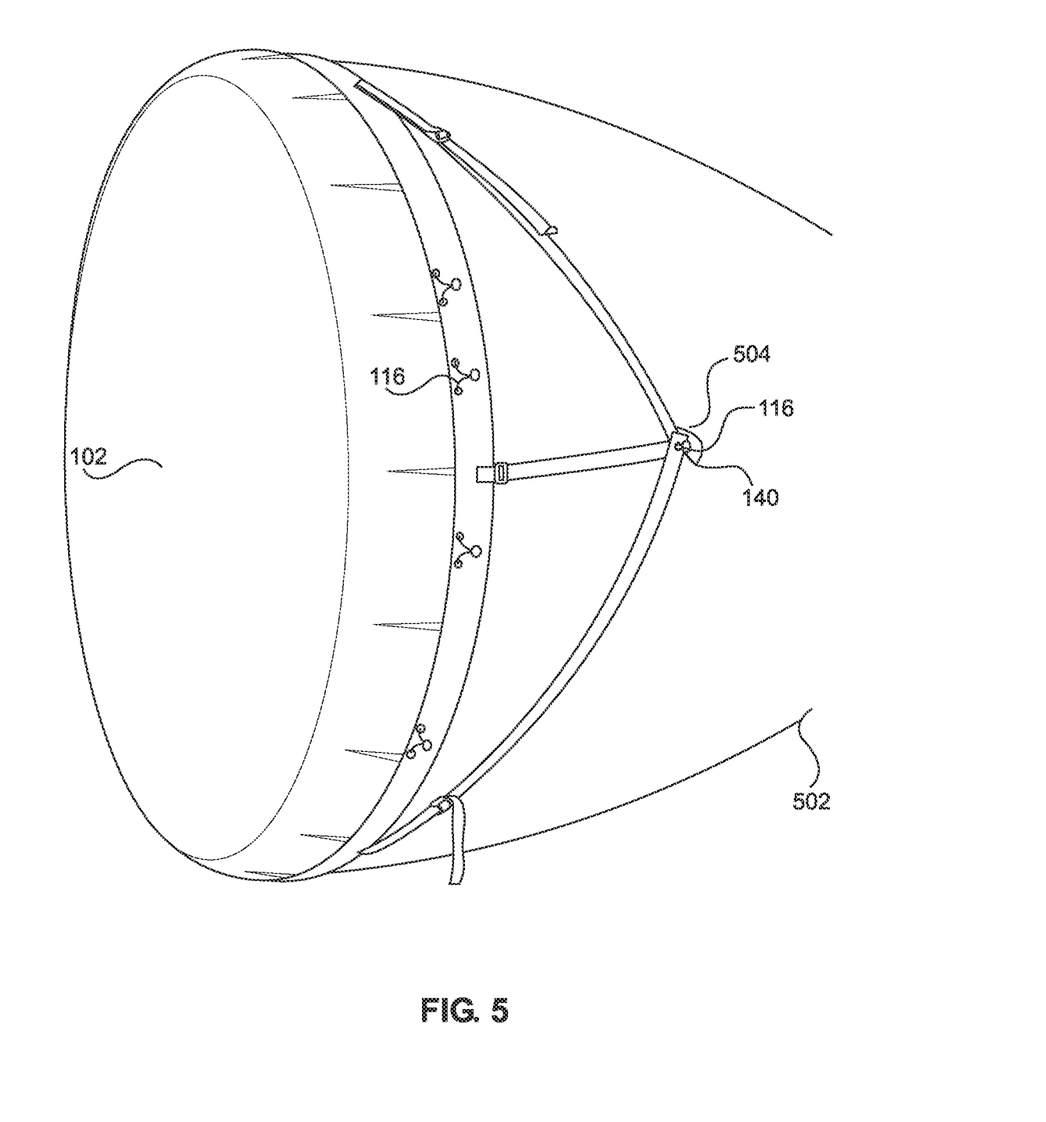
FIG. 5 illustrates a top-down view of an aspect of the subject matter in accordance with one embodiment.

FIG. 5 illustrates an embodiment of the protective cover 102 on an aircraft engine 502. A plurality of attaching mechanisms 116, for example a thumb bolt 140, attach the protective cover 102 to the aircraft engine 502 by entering through the threaded grommet element 134 into an anchor point 504, the anchor points 504 being existing holes or openings on the aircraft engine cowling, for example.

Some of the plurality of attaching mechanisms 116 are linked and held in place by a bungee cord 214.

Figure 6A:
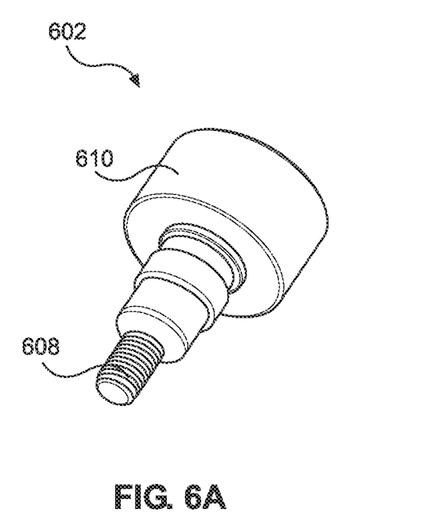
FIG. 6A illustrates a perspective view of the brass thumb bolt in accordance with one embodiment.
Figure 6B:
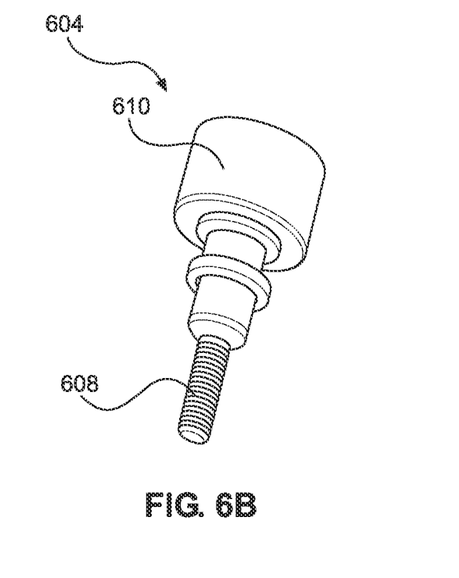
FIG. 6B illustrates a perspective view of the extended thread thumb bolt in accordance with one embodiment.
Figure 6C:
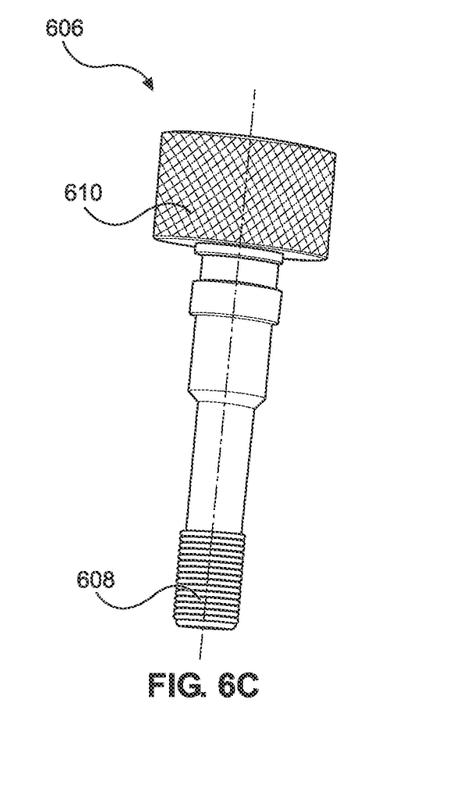
FIG. 6C illustrates a perspective view of the machined plastic long thumb bolt in accordance with one embodiment.

FIGS. 6A-6C illustrates the thumb bolts 602, 604, and 606 in greater detail.

Each thumb bolt 140 is a threaded fitting element, comprises a thumb portion 610 and a thread portion 608. The thread portion secures the protective cover 102 to an aircraft engine by threading through a threaded grommet element 134 and entering the anchor points 504 of an aircraft engine. Aircraft engine inlets comprise anchor points 504, or attach points, which are holes, where the thread portion 608 enters for releasably securing the protective cover 102 to the aircraft engine 502.

The thumb portion 610 can be gripped by a user.

Thumb bolts 140 are preferably selected from a list comprising: brass thumb bolts 602, or machined plastic thumb bolts, for example an extended thread thumb bolt 604 or a long thumb bolt 606.

The machined plastic thumb bolts are very strong, and are preferably made from computer numerical control (CNC) machined nylon (commercially known as Nylatron®) or similar. This material is softer than the anchor points 504 of the aircraft engine 502, which ensures no damage is done to the aircraft if they are installed incorrectly—for example, if they are cross threaded. Relative to the extended thread thumb bolt 604, the long thumb bolt 606 is typically inserted into larger anchor points 504.

CNC machining is a manufacturing process where pre-programmed computer software can direct tools to form thread portions 608 in the thumb bolts 140 and threaded grommet elements 134.

Brass is heavier than machined plastic, but thumb bolts made from brass generally have the same functionality as machined plastic thumb bolts.

The thumb bolts 140 are used to releasably attach or fasten the protective cover 102 to an aircraft engine 502, for example to an aircraft engine fan cowl when an aircraft is parked and the engines shut off.

Figure 7A:
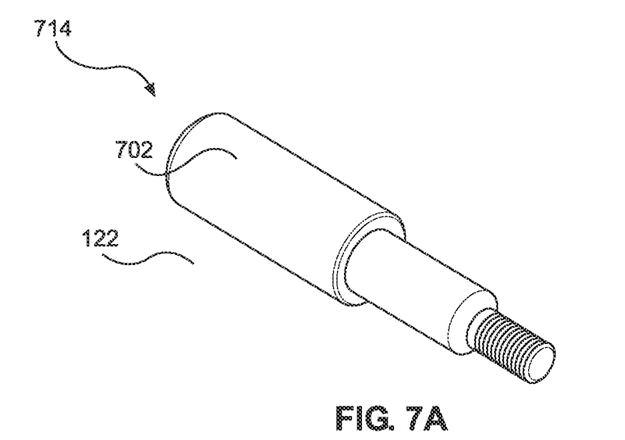
FIG. 7A illustrates a perspective view of a swivel hinge end in accordance with one embodiment.
Figure 7B:
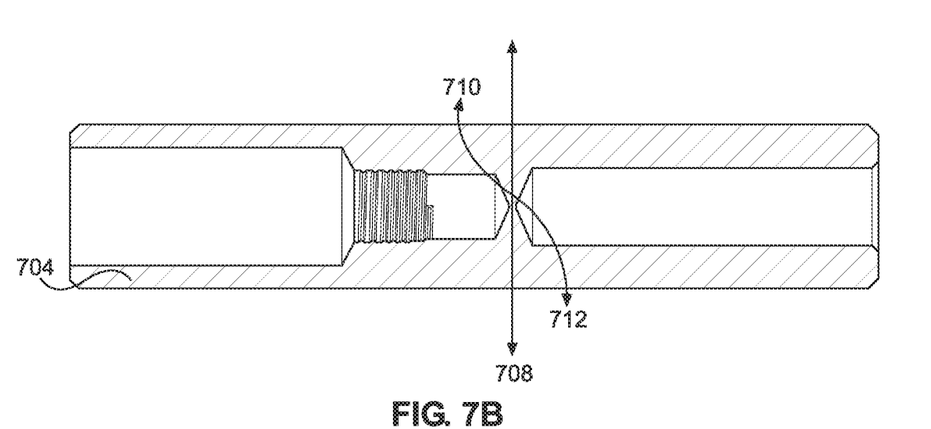
FIG. 7B illustrates a cross-sectional view of a swivel hinge cover in accordance with one embodiment.
Figure 7C:
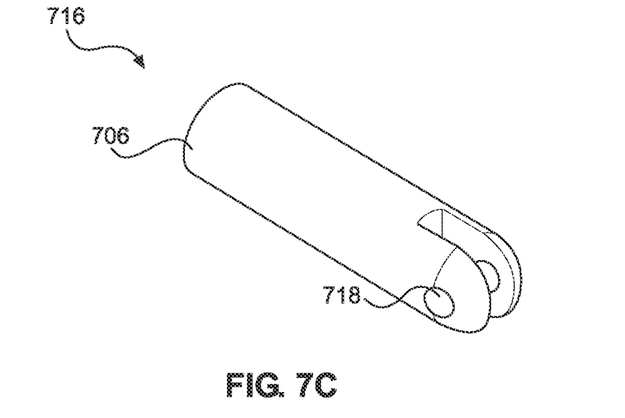
FIG. 7C illustrates a perspective view of a folding hinge end in accordance with one embodiment.

A hinge element 122 allows the protective cover 102 to fold. The hinge element 122 may comprise a swivel hinge 714 or a folding hinge 716.

The swivel hinge 714 comprises two swivel hinge ends 702, said swivel hinge ends 702 being in contact with one another, and encased in a swivel hinge cover 704, said swivel hinge ends being configured to twist or rotate about an axis 708, said axis being perpendicular to said swivel hinge ends 702.

Twisting the swivel hinge 714 in an inward direction 710 enables said frame element to fold to a smaller, storage configuration, while twisting the swivel hinge 714 in an outward direction 712 enables said frame element to lock into a larger, engine covering configuration.

The folding hinge 716 comprises two folding hinge ends 706, connected at a link point 718 with a pin or similar.

Figure 8A:
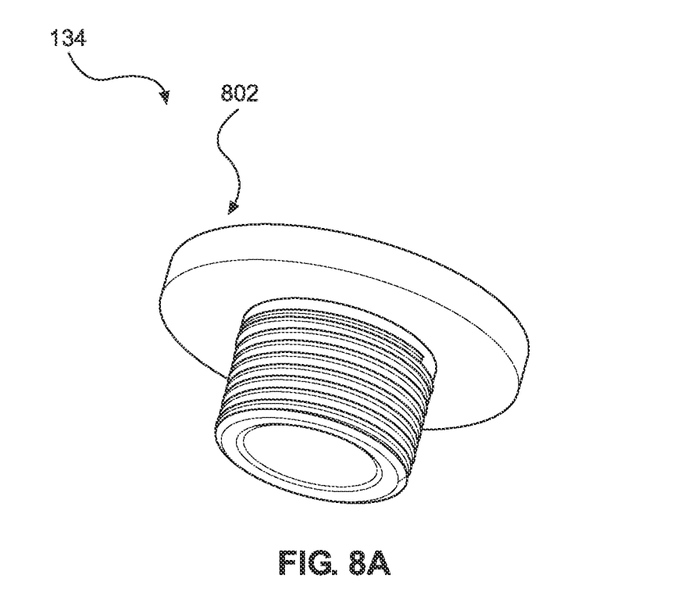
FIG. 8A illustrates a perspective view of the male part of the threaded grommet element in accordance with one embodiment.
Figure 8B:
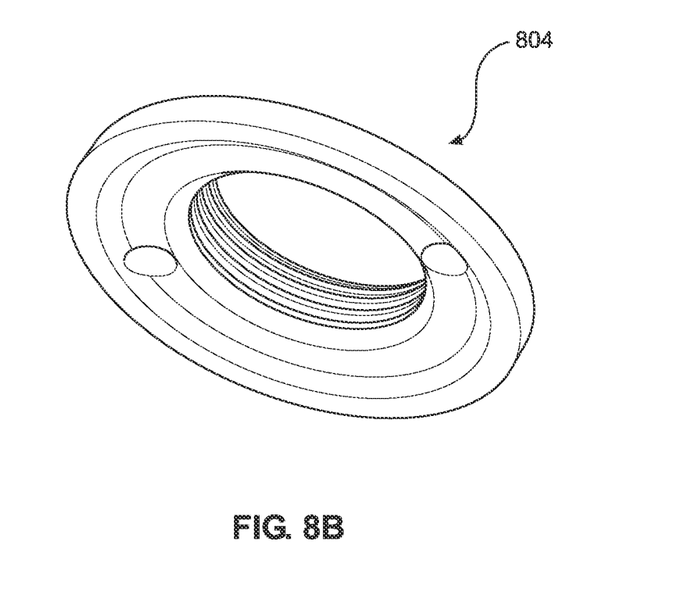
FIG. 8B illustrates a perspective view of the female part of the threaded grommet element in accordance with one embodiment.

FIGS. 8A and 8B illustrates a threaded grommet element 134, comprising a male threaded grommet element 802 (shown in FIG. 8A) and a female threaded grommet element 804 (shown in FIG. 8B). The male threaded grommet element 802 threads or screws into the female threaded grommet element 804, and is attached to a pull tab 132 or a flexible strap element 202.

The threaded grommet element 134 are durable and made from machined plastic such as CNC machined nylon (Nylatron®), and can be installed through many layers of webbing straps 204.

Due to threading together the male and female threaded grommet elements 802, 804, the threaded grommet element 134 cannot accidentally come apart. This is preferable to a grommet that snaps together, which can accidentally come apart and enter a nearby running engine at an airport, causing damage. Generally, prior art grommets snap together and cannot stay in place when used on thicker fabric, such as many layers of webbing material.

Thumb bolts 140 can enter the threaded grommet element 134 to attach the protective cover 102 to an engine aircraft.

Figure 9A:
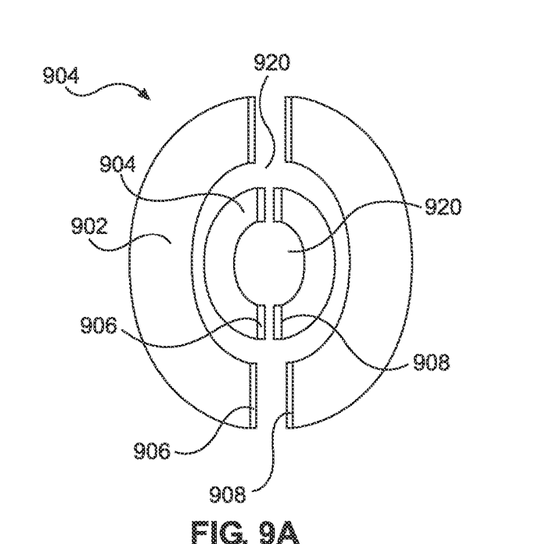
FIG. 9A illustrates an alternative protective cover embodiment in the form of ring-shaped engine exhaust covers.
Figure 9B:
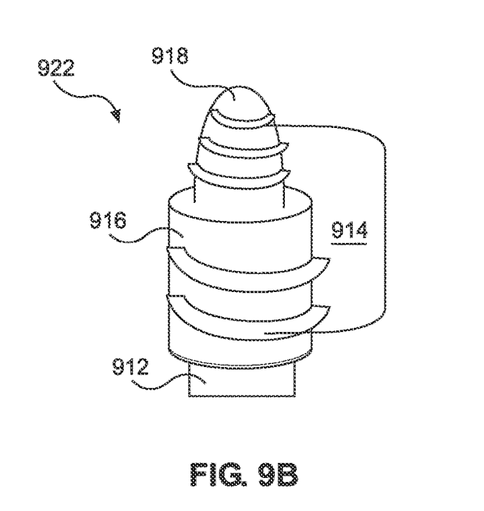
FIG. 9B illustrates an alternative protective cover embodiment in the form of a nozzle plug.
Figure 9C:
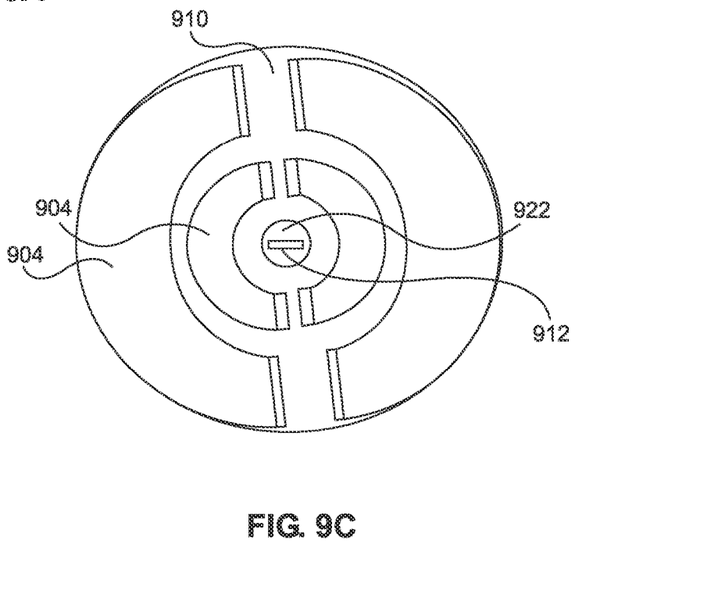
FIG. 9C illustrates an alternative protective cover embodiment in the form of the ring-shaped engine exhaust covers and the nozzle plug installed in an aircraft engine exhaust.

FIGS. 9A, 9B, and 9C display alternative embodiments of an engine exhaust protective cover 902.

An engine exhaust protective cover 902, configured to cover and protect an aircraft engine exhaust 910, preferably comprises one or more foldable ring-shaped covers 904, said ring-shaped covers having an open center 920 and a nozzle plug 922 having a generally cylindrical lower end 916, a dome shaped upper end 918, and a plurality of spaced, protruding rings 914 which encircle said lower end 916 and said upper end, 918, said nozzle plug 922, being sized and configured to fit in an engine exhaust 910 nozzle (covered in FIG. 9C by the nozzle plug 922).

The nozzle plug 922 preferable comprises a handle element 912 for gripping said nozzle plug 922, and the foldable ring-shaped covers 904 preferably comprise connection cooperating attaching mechanisms 906, 908, such as cooperating hook and loop ends, for attaching two halves of the foldable ring-shaped cover 904 to form a complete ring shape.

The foldable ring-shaped covers 904 may be folded in half for easy storage.

The pieces of the foldable ring-shaped covers 904 cover the engine exhaust 910 by being pressed into the engine exhaust 910.

The covers described herein preferably protect aircraft engines, whether they be exhausts or inlets. Engine inlet covers go over an engine inlet, and typically comprise a plurality of attaching mechanisms 116 which cooperate with existing attach points, in the form of holes, in an engine. Engine exhaust covers fit cooperatively into the engine exhaust to protect it, along with a nozzle plug to fit cooperatively into a nozzle.

Generally, each part of the protective cover 102 is manufactured separately, for example the one or more fabric layers 118 are manufactured to have breathable fabric and soft lining on the inside, and is preferably water, mold, and mildew resistant, and durable due to having reinforcing double stitching. Preferably, the fabric layers 118 allow moisture to be released from inside the engine and area, but keep moisture from entering the engine.

The attaching mechanisms 116 are machined and manufactured separately. Then the attaching mechanisms 116 are attached to the protective cover 102, for example by bungee cords 214, cable elements 120, and the like.

A generally circular ring-shaped frame element 112 is maintained by rod units 114, allowing the protective cover 102 to maintain form upon installation providing a safer environment for a user, for example an aircraft maintenance operator, without the need for stands or ladders during installation and removal which can be a safety concern for operators during all weather conditions.

The attaching mechanisms 116 are made from a softer material than the anchor points 504 that they are installed in ensuring no damage to costly engine components.

The one or more fabric layers 118 the covers are made from is a water repellent yet breathable. Parts that come in contact with the aircraft engine comprise a soft backing preferably ensure no abrasions or contaminants can be trapped between the aircraft engine and the protective cover.

The inspection door 128 allows visual inspection of the engine inlet without the need to remove the cover.

Flexible strap elements 202 allow the protective cover 102 to be opened on a singular side for maintenance without removing the entire protective cover 102.

Each cover uses a variety of attaching strategies, with unique thumb bolts 140, custom made to attach the protective cover 102 to an aircraft engine 502. A variety of different thumb bolts 140 and hook units 302 are used, including brass thumb bolts 602, machined plastic (CNC machined nylon, Nylatron®) long thumb bolt 606, extended thread thumb bolts 604, and hook units 302. The brass and machined nylon are softer than fixtures in an aircraft, so as to prevent damage to the aircraft fixtures.

Some of the covers retain their circumference by a rod unit 114, for example, two semicircle ¼ inch fiberglass rods, attached to custom designed steel folding hinge 716 by an epoxy adhesive allowing the protective cover 102 to fold in half, therefore reducing the need for a step ladder to reach the top of an aircraft engine, providing a safer work environment.

Some covers retain their circumference with a ¼ inch spring steel rod unit 114 encased in a cross-linked polyethylene tube to protect aircraft skin from contact with the spring steel rod unit 114. First and second rod unit ends 304, 306, are attached to a custom-made swivel hinge 714 with an epoxy adhesive which allows the cover to twist and fold into a smaller size for storage.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The foregoing descriptions of specific embodiments of the present invention have been presented for purposes of illustration and description. They are not intended to be exhaustive or to limit the invention and method of use to the precise forms disclosed. Many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A protective cover for engines, comprising:
   a generally circular cross-section, a circumference, an outer side, and an inner side;
   said circumference being defined by a ring shaped frame element having generally circular ring shape formed by a rod unit;
   said ring shaped frame element comprising a plurality of attaching mechanisms being dispersed around said ring shaped frame element, and being sized and configured to releasably attach said protective cover to an engine;

said generally circular cross-section comprising one or more fabric layers contained in said ring shaped frame element;

an inspection door opening being housed in the one or more fabric layers; and a plurality of handle elements affixed to said protective cover providing a means of grasping said protective cover;

wherein said plurality of attaching mechanisms comprise a plurality of thumb bolts having a thumb portion and a thread portion opposite to said thumb portion, the thread portion being sized and configured to cooperate with a plurality of threaded grommet elements, said threaded grommet elements being attached to said protective cover.

2. The protective cover of claim 1, further comprising: one or more hinge elements attached to said rod unit, said hinge element enabling said protective cover to unfold to a large, engine covering configuration or fold to a small, storage configuration.

3. The protective cover of claim 2, wherein said rod unit is composed of steel or fiberglass and is attached to the hinge element.

4. The protective cover of claim 3, wherein said hinge element is a folding hinge, comprising a first and second folding hinge end, said folding hinge ends being attached at a link point by a pin or similar.

5. The protective cover of claim 2, wherein said hinge element is a swivel hinge, said swivel hinge comprising a first and second swivel hinge end, said swivel hinge ends each being attached to a first and second rod unit end, said swivel hinge ends being configured to twist about an axis, said axis being perpendicular to said swivel hinge ends.

6. The protective cover of claim 5, wherein twisting the swivel hinge in an inward direction enables said frame element to fold in to a smaller, storage configuration, while twisting the swivel hinge in an outward direction enables said frame element to lock into a larger, engine covering configuration.

7. The protective cover of claim 1, further comprising one or more flexible strap elements for securing said protective cover to said engine.

8. The protective cover of claim 7, wherein said flexible strap element is an elastic strap, said elastic strap being unhoused and located on said outer side of said protective cover, said elastic strap extending around said circumference.

9. The protective cover of claim 7, wherein said flexible strap element is a bungee cord, said bungee cord being housed between said outer side and said inner side, said bungee cord extending around said circumference.

10. The protective cover of claim 7, wherein said flexible strap is a plurality of webbing straps having a first and second end, said first end being attached to said protective cover, and said second end being attached, by a cable element, to one or more of said plurality of attaching mechanisms, said plurality of webbing straps having a plurality of ladder locks providing a means of adjusting a length of said plurality of webbing straps.

11. The protective cover of claim 1, said one or more fabric layers comprising an outer layer on said outer side, and an inner layer on said inner side.

12. The protective cover of claim 11, wherein said outer layer comprises a durable, waterproof, and breathable fabric and said inner layer comprises a soft, scratch resistant, flannel-like fabric.

13. The protective cover of claim 12, wherein said outer layer further comprises an additional waterproof and oil shedding finish layer.

14. The protective cover of claim 1, wherein said plurality of attaching mechanisms are attached to said protective cover by a cable element or a bungee cord.

15. The protective cover of claim 1, said plurality of attaching mechanisms are selected from a list comprising: machined brass threaded fittings, machined plastic threaded fittings, or a machined plastic hook units, or combinations thereof.

16. The protective cover of claim 15, wherein the machined plastic threaded fittings and the machined plastic hooks are formed from computer numerical control machined nylon.

* * * * *